Patented June 26, 1928.

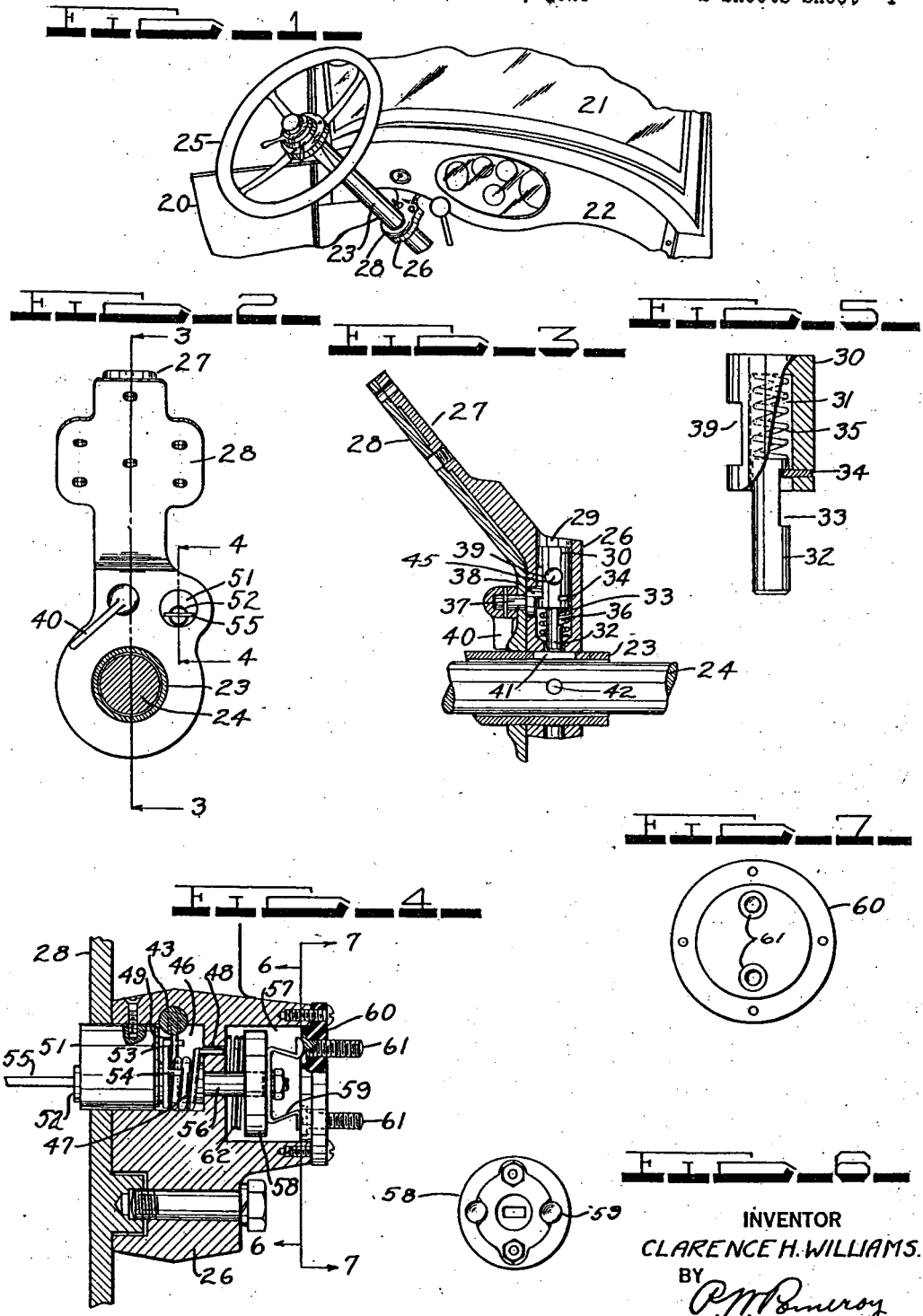

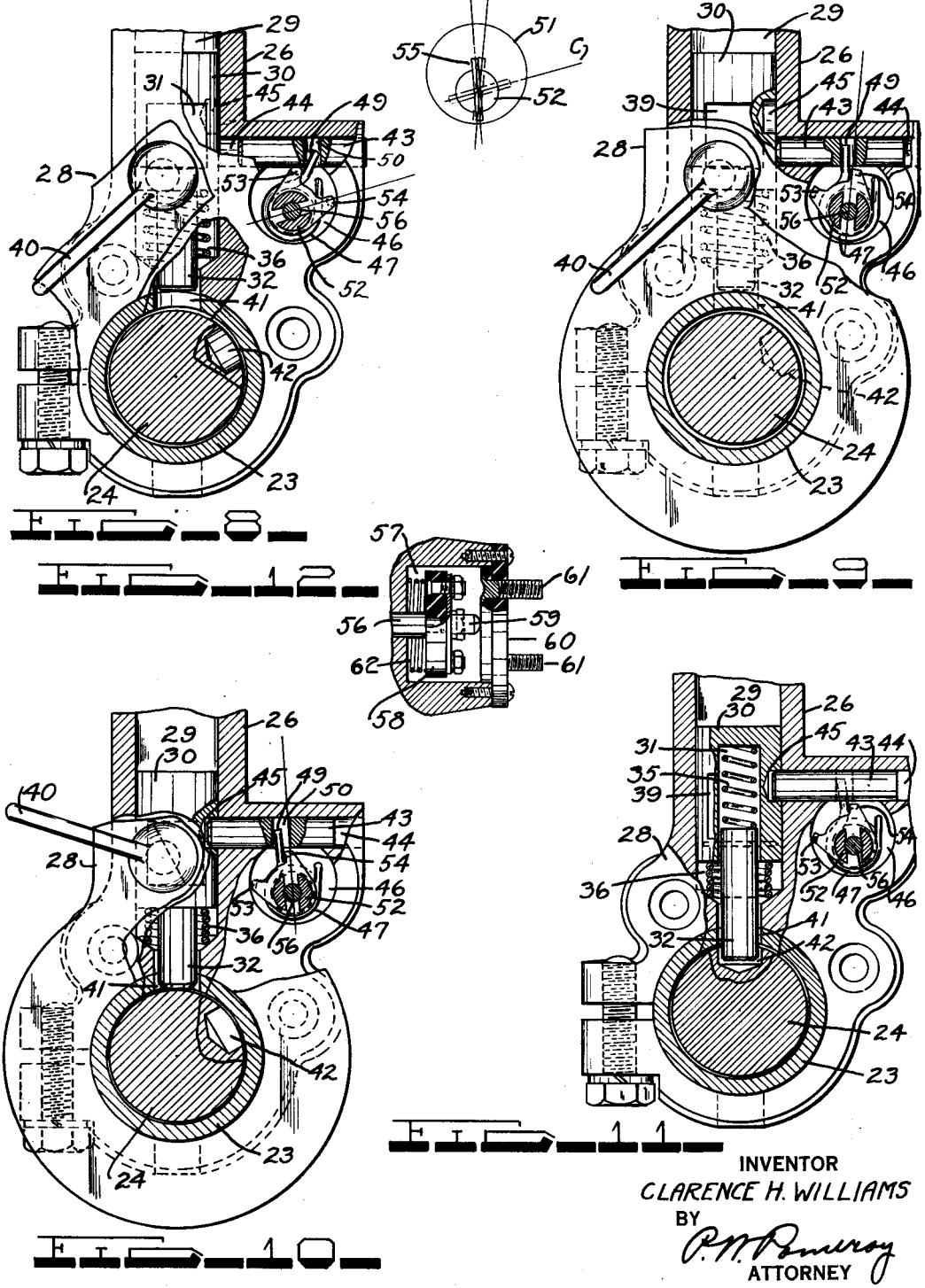

1,674,936

UNITED STATES PATENT OFFICE.

CLARENCE H. WILLIAMS, OF DETROIT, MICHIGAN, ASSIGNOR TO THE STUDEBAKER CORPORATION, OF SOUTH BEND, INDIANA, A CORPORATION OF NEW JERSEY.

LOCK.

Application filed February 14, 1925. Serial No. 9,304.

This invention relates to locking devices for automobiles and the like to prevent theft of the same, and refers to that class of locks which are adapted to operate in connection with the steering gear shift, or other control mechanism of an automobile whereby the same may be locked against movement.

More particularly it refers to that class of locks which are coming to be known as "coincidental" locks, that is, those types of locks which, in addition to locking a movable controlling part of the automobile against movement, also incorporate the ignition circuit controlling switch therein, so that when the key is turned to shut off the engine, a movable part of the car is also locked against movement.

Heretofore the construction of this type of locks has been such that it has been impossible to shut off the engine without locking the car as above described, and while such a construction has certain advantages from an anti-theft point of view, it also has serious disadvantages from another point of view, particularly in descending long steep grades. In the latter case it is desirable to shut off the engine with the automobile in gear so that the engine will act as a brake, the usual wheel brakes, as a rule, being insufficient to apply a long, continuous vigorous braking effect over the long period of time that may be consumed in such a descent. In case such a lock is of the steering type, it will be apparent that if the engine is shut off it will be impossible to steer the automobile, and in view of the fact that mountainous or hilly roads are almost invariably of the winding type, it will be further evident that loss of the ability to steer the automobile would be disastrous. Again, if the lock is of the gear shift type, in which type the gears can be locked only in the neutral or non-driving position of the gear shift mechanism, the engine cannot be shut off without dispensing with its use as a brake as above described, with the result that the driver would have to rely solely on the wheel brakes, which, as mentioned above, are not usually of such size or capacity to withstand a long uninterrupted continuous vigorous use, and should they fail in descending a long steep grade the disastrous effects possible are clearly apparent.

It is such defects in the so-called "coincidental" types of locks that the present invention contemplates removing, without materially reducing the advantages thereof from the anti-theft point of view, and this is the principal object of the present invention.

This result is obtained by providing a construction whereby the ignition circuit controlling switch is operated coincidentally with the mechanical locking device by the key for the latter, the key being so positioned in regard to the switch that when the switch is on so as to close the ignition circuit, the mechanical locking device will be in unlocked position, and when the key is moved out of unlocked position, but not far enough to move the locking device to locked position, the ignition circuit will be opened but the mechanical locking device will not be locked, and when in such position it will be impossible to remove the key which can only be removed when both the ignition switch is moved to open circuit position and the mechanical locking device is in locked position, and this is another object of the present invention.

More specifically, it is an object of the present invention to provide, in combination with an automobile, a mechanical locking device and an ignition circuit switch controllable by a single means and being such that the switch may be operated to open the ignition circuit without placing the mechanical locking device in locked position.

Another object is to provide a locking device and an electric switch both of which are operated by a single key, the key being removable only when the locking device is in locked position, the relation of the locking device and the switch being such that the switch may be placed in open circuit position without placing the locking device in locked position.

The above being among the objects of the present invention, the same consists of certain features of construction and combinations of parts to be hereinafter described with reference to the accompanying drawing, and then claimed, having the above and other objects in view.

In the accompanying drawings which illustrate a suitable embodiment of the present invention, and in which like numerals refer to like parts throughout the several views, Figure 1 is a perspective view of a portion of an automobile, showing a steering column to which a locking device is applied and which incorporates an embodiment of the present invention.

Figure 2 is a view of the locking device shown mounted on the steering column in Figure 1, taken in the direction of the axis of the steering column towards the upper or face side of the same.

Figure 3 is a sectional view taken on the line 3—3 of Figure 2.

Figure 4 is an enlarged sectional view taken on the line 4—4 of Figure 2 showing the construction and the position of the ignition switch in relation to adjacent parts.

Figure 5 is a partially broken view of the main and auxiliary locking plungers in assembled position.

Figure 6 is a view of the movable switch member taken on the line 6—6 of Figure 4.

Figure 7 is a view of the stationary switch member taken on the line 7—7 of Figure 4.

Figure 8 is an enlarged face view of the locking device in unlocked position and with the ignition switch in circuit closing position as shown in Figure 2, parts thereof being broken away to better illustrate the construction.

Figure 9 is a view similar to Figure 8 with the device in unlocked position but with the ignition switch in open circuit position.

Figure 10 is a view similar to Figures 8 and 9 but with the locking device in locked position and the ignition switch in open circuit position, and also showing the position the main locking plunger assumes when the device is in locked position but when the plunger opening in the steering column is not in matching relation with the same.

Figure 11 is a view corresponding to Figure 10 but showing the relative position of the main plunger when the plunger opening in the steering column is brought into matching relation therewith.

Figure 12 is a fragmentary sectional view of the ignition switch in off or open circuit position taken on the line 4—4 of Figure 2.

Figure 13 is a face view of the locking cylinder and key only, showing the relative positions of the key for the various operative positions of the lock and switch.

Although the embodiment of the present invention illustrated in the drawings is shown in connection with a so-called steering column lock, it will be understood that it is not limited to this type of lock but is readily adaptable to other types of so-called "coincidental" automobile locks.

In the drawings, as above explained, the embodiment of the present invention is shown in combination with a steering column lock, and the relative position thereof is shown in Figure 1 which shows a portion of an automobile including a body 20, a windshield 21, an instrument board 22 and a steering column 23 which incases the usual steering post 24 terminated at its upper end by the usual steering wheel 25 and various other control devices.

The steering post lock comprises a casing 26 which surrounds the column 23 and is provided with an extending arm or flange 27 which extends upwardly and back of the instrument board 22 and is secured thereto to provide an additional support for the steering post and to prevent relative turning movement of the lock. The casing 26 and flange 27 is provided with a face plate or member 28 which overlies the exposed faces of the same for the purpose of giving a finished appearance to the same and for another purpose to be hereinafter described.

The casing 26 is provided with an opening 29 therein which extends perpendicular to the axis of the steering post 24, it being on the unexposed side of the casing 26 and extends at full diameter to a point adjacent to the central opening in the casing 26 which receives the column 23 where it is reduced in size and continues on through to said column opening. Slidably received in the opening 29 is the auxiliary locking plunger 30 which is provided with a blind axial opening 31 opening towards the steering column, and which slidably receives therein the main locking plunger 32 which extends out therefrom and is guided in the reduced portion of the opening 29. The main plunger 32 is provided with an elongated notch 33 in its surface, as plainly shown in Figure 5, and a key member 34 is secured in a slot in the side of the auxiliary plunger 30 and projects into the notch 33, thereby allowing axial movement of the main plunger 32 within the limits of the notch 33 but preventing it from being inadvertently projected out of the auxiliary plunger 30. A coil spring 35 positioned in the opening 31 between the blind end thereof and the end of the main plunger 32 constantly tends to project the main plunger 32 out of the auxiliary plunger 30, the main plunger 32 being prevented from being completely ejected by the key member 34 previously described. A second coil spring 36 positioned in the opening 29 between the reduced portion thereof and the end of the auxiliary plunger 30 constantly exerts a tendency to project the auxiliary plunger 30 away from the steering column.

Journaled in the face plate 28 parallel to the axis of the steering column is a spindle member 37 (see Figure 3) which is provided on the under side of the plate 28 with an eccentric portion 38 which engages a notch 39 formed in the surface of the auxiliary plunger 30. The other end of the spindle projects through the face plate 28 and is provided with a relatively non-rotatable handle 40. The eccentric portion 38, in engaging the notch 39, limits the upper position to which the auxiliary plunger 30 may be projected and it will be apparent that when the handle 40 is turned to bring the eccentric portion 38 down towards the steering column, the auxiliary plunger 30 will be forced down with it, compressing the spring 36. When the auxiliary plunger 30 is in its upper position, the lower end of the main plunger lies immediately above the steering column 23 which is provided with an opening 41 matching the reduced portion of the opening 29. The steering post 24 is also provided with an opening, designated as 42, which may also be brought into matching relation with the opening 29 when it is rotated to the proper position by the steering wheel 25.

When the handle 40 is turned to force the auxiliary plunger 30 downwardly, the main plunger 32 is projected through the opening 41, and if the opening 42 is not in matching relation therewith, as shown in Figure 10, the end of the main plunger 32 bears against the steering post 24 and, further, movement being prevented thereby, is caused to recede further into the auxiliary plunger 30, thereby compressing the spring 35. It will be evident that as soon as the opening 42 is brought into matching relation with the main plunger 32 under such circumstances, the force of the spring 35 in its compressed state will project the main plunger 32 into the opening 42 as indicated in Figure 11, and that the steering post 24 will then be locked against further rotation.

In order to hold the parts in this locked position, a cross bolt 43 is slidably received in an opening 44 in the casing 26 perpendicular to and intersecting the axis of the opening 29. The auxiliary plunger 30 is provided with an opening 45 which is adapted to match the opening 44 when the auxiliary plunger 30 is in locked position as indicated in Figures 10 and 11, and when in such position the cross bolt 43 may be projected into the opening 45 and thereby prevent withdrawal of the auxiliary plunger 30 and main plunger 32.

Another opening 46, formed in the face plate 28 and casing 26 parallel to the axis of the steering column, extends downwardly from the upper face thereof to a point below the opening 44, and intersects a portion of the opening 44 as clearly shown in the drawings. In the bottom of this opening 46 is positioned a short torsional coil spring 47 the axis of which is concentric with the axis of the opening 46, and one end of which is bent out in a direction parallel to the axis of the coil and held against movement by seating in an opening 48 at the bottom of the opening 46 as clearly shown in Figure 4. The other end of the coil spring 47 is bent outwardly tangentially to the coil as at 49 and extends upwardly into an opening 50 in the cross bolt 43, the end 49 tending to move towards the plungers 30 and 32 and thereby tending to move the cross bolt 43 in such direction.

In the open end of the opening 46 is secured a conventional lock comprising a barrel 51 and a key controlled rotatable cylinder 52 preferably of the type in which the key is insertable and withdrawable in one position only, that position being indicated as position A in Figure 13 which will later be explained. The inner end of the cylinder 52 projects past the inner face of the barrel 51 and carries thereon a relatively non-rotatable radially extending member provided at its outer edge with two spaced axially parallel fingers 53 and 54 lying across the path of movement of the end 49 of the spring 47, one of said fingers being positioned on one side of the end 49 and the other finger being positioned on the other side. Supposing that the lock is in locked position as shown in Figures 10 and 11, and a proper key 55 is inserted in the cylinder 52, it will lie, in the arrangement of the parts shown in the drawings, in the plane of the line A, as indicated in Figure 13. If the key 55 is turned from such position A in a clockwise direction to the position indicated by line C in Figure 13, carrying with it, in turning, the cylinder 52 and fingers 53 and 54, the finger 53 will engage the end 49 of the coil spring 47 and will carry it and the cross bolt 43 along with it, and in so doing will disengage the cross bolt 43 from the opening 45 in the auxiliary plunger 30. It will be apparent that as soon as the cross bolt 43 is disengaged from the opening 45, the spring 36 will immediately act to project the auxiliary plunger 30 upwards, and in moving upward it will carry the main plunger with it out of the opening 42 in the steering post 24, as indicated in Figures 8 and 9, and thereby free the latter so that it may be turned in the operation of guiding the automobile of which it forms a part. When the mechanism is in the last position described, and the handle 40 is rotated as previously described to force the auxiliary plunger 30 downwardly, as soon as the latter reaches such a position that the opening 45 comes into matching relation with the cross bolt 43, the bolt 43 can be projected thereinto by turning the key 55 to hold the plunger 30 in such downward position as previously described.

Up to this point the description has dealt with the construction of the mechanical locking device only, and inasmuch as the present invention deals with the so-called coincidental type of locks in which a mechanical locking device is combined with an ignition circuit controlling switch to be operated simultaneously therewith, the manner of operating such a switch in combination with the above described mechanical locking device, and a description of the construction of the switch, will now follow.

As shown in Figure 4, the cylinder 52 of the key controlled lock is provided with an extending relatively non-rotatable stem 56 which projects through the bottom of the blind opening 46 and into another opening 57 formed in the back face of the casing 26 concentric with the cylinder 52. Non-rotatably secured to the end of the stem 56 is an insulated block 58 which carries a diametrically positioned U shaped spring contact member 59, the sides of the U being substantially parallel to the axis of the stem 56 and spaced therefrom and terminate in ball shaped ends. A non-rotatable plate 60 formed from insulating material closes the open end of the opening 57 and carries two diametrically positioned binding posts 61 which project therethrough and terminate within the opening 57 in a headed portion having a depression in the exposed face thereof, which depressions are adapted to receive the ball ends of the contact member 59 when the key 55 is turned to bring it into the plane of the line C indicated in Figure 13, which position corresponds to the full unlocked position of the mechanical locking device as indicated in Figure 8. The binding posts are connected up in series with the engine ignition circuit and it will be readily apparent that when the key 55 is in a position corresponding to the line C in Figure 13, at which time the ball ends of the contact member 59 rest in the depressions formed in the head of the binding posts 61 as shown in Figure 4, the electrical current may pass from one binding post 61 through the contact member 59 to the other binding post 61. When in such position C, the ignition circuit switch is in closed or engine operating position. As will be noted in Figure 8, which corresponds to this position of the mechanism, the end of the cross plunger 43 is spaced from the auxiliary plunger 30, it being held in such spaced position in spite of the spring action of the torsional coil spring 47 by reason of the resistance offered to springing the ball ends of the contact member 59 out of the depressions formed in the heads of the binding posts 61. In order that such resistance will be always available, it is preferable to make the block 58 slidable on the stem 56 and back it up with a spring such as 62 which constantly urges it towards the binding posts 61. As is further apparent in Figure 8, when the mechanism is in the position there shown, which corresponds to position C of the key 55 as shown in Figure 13, the finger 53 is in contact with the end 49 of the spring 47. Now, if the key 55 is turned from position C to position B, as indicated in Figure 13, in which position the various parts assume the positions shown in Figure 9, the cross bolt 43 moves over and abuts against the side of the auxiliary plunger 30, the finger 54 contacts against the end 49 of the spring 47, and the ball ends of the contact member 59 moves out of contact with the binding posts 61 as shown in Figure 12. In such position it is apparent that the steering post 24 is still rotatable as the plungers 30 and 32 are still in raised or unlocked position, and the ignition circuit is in open or non-engine-operating position, and that further anti-clockwise movement of the key 55 is impossible due to the fact that the finger 54 is contacting against the end 49 of the spring 47 which cannot move further towards the auxiliary plunger 30 because the cross bolt 43 abuts against the latter in a non-matching relation with the opening 45. Inasmuch as the key 55 is withdrawable only when in position A as previously explained, it will be apparent that it is impossible to lock the mechanism when in the position indicated in Figure 9 and when in this position, the engine electrical circuit is shut off but the mechanical lock is in unlocked position. When the mechanism is in such position, if the handle 40 is moved to force the auxiliary plunger 30 down to bring the opening 45 into matching relation with the cross bolt 43, the latter is immediately projected thereinto by the force of the spring 47 as indicated in Figures 10 and 11. When the cross bolt 43 is thus projected into the opening 45, the end 49 of the spring 47 moves over in accordance therewith, allowing the finger 54 and consequently the cylinder 52 to move accordingly into position A in which position the key 55 may be removed, and when removed it is apparent that the mechanical locking device is locked and the engine ignition circuit is in open or broken position.

The effect of the foregoing construction is that although the mechanical locking device and the ignition switch is operated, in effect, simultaneously by the same means, the ignition may be turned off without locking the mechanical device, and that when one is locked both are locked. This allows the operator to shut off the engine when desired without interfering in any other manner with the control of the automobile, a feature not present in any other of the so-called coincidental types of locks now on the market. From the foregoing description it will also be apparent that the locking member can be moved to unlocking position without moving the ignition device to close the ignition circuit.

As previously mentioned, the present invention is not limited to the steering column type of mechanical locks, but may be adapted for use in connection with any other of the various forms of mechanical locks and its adaptation to such other locks is believed, in view of the above explanation and description, to be within the province of the ordinary workman skilled in this art.

Formal changes may be made in the specific embodiment of the invention described without departing from the spirit and substance of the broad invention, the scope of which is commensurate with the appended claims.

What I claim is:—

1. In an automobile provided with an ignition switch and a plunger to secure a mechanical part of said automobile against movement, a lock for said plunger, means to operate said switch and to lock said plunger against movement comprising a key-controlled device connected to both said switch and said lock, and means for simultaneously moving said lock and switch during one phase of movement of said key and for permitting the movement of said switch in advance of said lock during another phase of movement of said key.

2. In an automobile having a device for locking a mechanical part against movement and an electric switch, means for operating said switch and locking said device against movement comprising a key controlled lock having a direct connection with said switch and a lost motion connection with said device.

3. In an automobile provided with a mechanical lock and an ignition switch, single means operable to place said lock in unlocked position and said switch in closed circuit position, said means including a direct connection with said switch and a lost motion connection with said lock whereby said switch may be returned to open circuit position without placing said lock in locked position.

4. In an automobile having a steering gear and an engine, a mechanical device for preventing movement of said steering gear, a switch for controlling the ignition of said engine, and key-controlled means operable to secure said mechanical device against movement and move said switch to open circuit position, said key-controlled means including a lost motion connection to said lock and a direct connection to said switch whereby said switch may be moved to open circuit position without placing said mechanical device in locked position.

5. In an automobile having means for locking a mechanical part against movement and an electric switch, a lock for said means, a key-controlled device connected to operate both said lock and said switch, and means whereby when said key-controlled device is moved in one direction said mechanical part is unlocked and said switch is moved to closed circuit position, and when said key-controlled device is moved in another direction said switch is opened without locking said mechanical part.

6. In an automobile, a mechanical device for locking a controlling part thereof against movement, a switch, a lock for said device, a key-controlled device connected to secure said lock against movement and move said switch to a predetermined position, said controlling device being operable to place said mechanical device in unlocked position and said switch in closed circuit position, and means whereby said key-controlled device may also be operated to place said switch in open position without placing said mechanical device in locked position.

7. In an automobile, a plunger for locking a mechanical part against movement, a lock for said plunger, an electrical switch, and a key-controlled means operatively connected with said lock and switch, said key-controlled means when moved in one position operating said lock to release said plunger from locked position and close said switch, said key when moved to a second position operating said lock without locking said plunger and moving said switch to open position, and said means when moved to a third position operating said lock to engage said plunger and maintain said switch in open position.

8. In an automobile, a movable member provided with a recess, a bolt engageable with said member in said recess, an electric switch, a key-controlled member operable to shift the position of said bolt and said switch, and means operated by said key-controlled member adapted to move said bolt out of said recess when said switch is moved to closed circuit position, said key-controlled member being operable to move said switch to open circuit position without moving said bolt into said recess.

9. In combination with an automobile steering shaft, a plunger mechanism adapted to be moved into engagement with said shaft to prevent rotation thereof, a bolt engageable with said plunger mechanism to maintain engagement thereof with said shaft, an electric switch, a key controlled locking device, a lost motion connection between said bolt and said locking device, and a direct connection between said switch and said locking device.

10. In combination with a movable member provided with a recess, a plunger mechanism operable to engage said recess and prevent movement of said member, a slidable bolt for securing said plunger mechanism in recess-engaging position, an electric switch, a key-controlled member, and connections between said key-controlled member and both said switch and bolt permitting said bolt to be moved to plunger disengaging position and said switch to closed circuit position upon movement of said member in one direction, said switch being moved to open circuit position without moving said bolt into engaging position with said plunger upon movement of said member in the opposite direction.

11. In combination with a rotatable member, a plunger mechanism movable into engagement with said member to prevent rotation thereof, means for moving said plunger mechanism out of engagement with said member, a bolt for holding said plunger mechanism in engagement with said rotatable member, an electric switch, and a key-controlled member directly connected to said switch and connected to said bolt by a lost motion connection, whereby said bolt and said switch may be operated upon rotation of said key-controlled member in one direction, and said switch may be operated in advance of said bolt upon rotation of said key-controlled member in the opposite direction.

12. In a coincidental lock, a reciprocable locking member, a rotatable ignition circuit make and break mechanism, means for sliding said member to locked position, means for rotating the make and break mechanism to "off" position, said second means being operable to slide said locking member from locking position without rotating said make and break mechanism to "on" position, and means for holding said locking member and the make and break mechanism in unlocked and "on" positions respectively.

Signed by me at Detroit, Michigan, U. S. A., this 10th day of February, 1925.

CLARENCE H. WILLIAMS.